(12) United States Patent
Singh et al.

(10) Patent No.: US 9,495,522 B2
(45) Date of Patent: Nov. 15, 2016

(54) SHARED SESSION TECHNIQUES

(71) Applicant: Microsoft Corporation, Redmond, WA (US)

(72) Inventors: Karanbir Singh, Seattle, WA (US);
Yashar Bahman, Seattle, WA (US);
Octavian T. Ureche, Bellevue, WA (US); John Michael Sheehan, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 113 days.

(21) Appl. No.: 14/476,328

(22) Filed: Sep. 3, 2014

(65) Prior Publication Data

US 2016/0063226 A1    Mar. 3, 2016

(51) Int. Cl.
| | | |
|---|---|---|
| *G06F 21/00* | (2013.01) | |
| *G06F 21/30* | (2013.01) | |
| *G06F 21/31* | (2013.01) | |
| *H04L 29/08* | (2006.01) | |
| *H04L 29/06* | (2006.01) | |

(52) U.S. Cl.
CPC .............. *G06F 21/30* (2013.01); *G06F 21/31* (2013.01); *H04L 67/14* (2013.01); *H04L 67/306* (2013.01); *H04L 69/14* (2013.01)

(58) Field of Classification Search
CPC ..................................................... G06F 21/31
See application file for complete search history.

(56) References Cited

U.S. PATENT DOCUMENTS

| | | | |
|---|---|---|---|
| 7,711,847 B2 | 5/2010 | Dhupelia et al. | |
| 7,765,401 B2 | 7/2010 | Multerer et al. | |
| 7,984,428 B1* | 7/2011 | Seymour | G06F 9/4445 717/125 |
| 8,037,521 B2* | 10/2011 | Minato | G06F 21/31 726/16 |
| 8,626,804 B2 | 1/2014 | Xu | |
| 8,732,284 B2* | 5/2014 | Williamson | G06F 21/31 709/222 |
| 8,769,622 B2 | 7/2014 | Chang et al. | |
| 2006/0059335 A1 | 3/2006 | Bernardi et al. | |

(Continued)

FOREIGN PATENT DOCUMENTS

| | | |
|---|---|---|
| WO | 2004015897 A2 | 2/2004 |
| WO | 2005076881 A2 | 8/2005 |

OTHER PUBLICATIONS

European Patent Office, "Notification of the Transmittal of the International Search Report and Written Opinion of the International Searching Authority," issued in PCT Application No. PCT/US2015/047635, mailed date: Feb. 23, 2016, 22 Pages.

(Continued)

*Primary Examiner* — Ali Shayanfar
(74) *Attorney, Agent, or Firm* — Tim Churna; Dan Choi; Micky Minhas

(57) ABSTRACT

Data sharing session techniques are described. In one or more implementations, a first user login session is initiated as running in a context of a first user profile of a first user with an operating system of a computing device. A request is received by the operating system to run the first user login session in a context of a second user profile of a second user. The second user profile is associated by the operating system with a shadow login session created within the first user login session of the operating system of the computing device such that interaction of the second user with the operating system is associated with the second user profile and interaction of the first user with the operating system is associated with the first user profile.

11 Claims, 8 Drawing Sheets

(56) References Cited

U.S. PATENT DOCUMENTS

| | | |
|---|---|---|
| 2007/0162574 A1 | 7/2007 | Williamson et al. |
| 2007/0198744 A1 | 8/2007 | Wensley et al. |
| 2009/0189791 A1* | 7/2009 | Brinton ................. G06F 21/316 341/22 |
| 2009/0260060 A1 | 10/2009 | Smith et al. |
| 2011/0004649 A1* | 1/2011 | Nord ..................... H04L 67/306 709/202 |
| 2011/0197263 A1* | 8/2011 | Stinson, III ............. G06F 3/011 726/4 |
| 2011/0246235 A1 | 10/2011 | Powell et al. |
| 2012/0204116 A1* | 8/2012 | Patil ...................... G06F 9/4443 715/753 |
| 2012/0284501 A1* | 11/2012 | Zievers ................. G06F 15/781 713/100 |
| 2013/0073980 A1* | 3/2013 | Amendolagine ..... G06F 3/0481 715/751 |
| 2014/0137185 A1* | 5/2014 | Tirosh ................... H04L 63/104 726/1 |
| 2015/0046990 A1* | 2/2015 | Oberheide .............. G06F 21/32 726/6 |
| 2015/0365400 A1* | 12/2015 | Cox .................... H04L 63/0823 726/7 |

OTHER PUBLICATIONS

"2-Hosting a Multi-Tenant Application on Windows Azure", Published on: Mar. 28, 2013, Retrieved from <http://msdn.microsoft.com/en-us/library/hh534478.aspx> on Aug. 5, 2014, 19 pages.

Fitzpatrick, Jason, "TeamPlayer Enables Multiple Input Devices", Published on: Dec. 6, 2008, Available at <http://lifehacker.com/5080196/teamplayer-enables-multiple-input-devices>, 7 pages.

European Patent Office, "Written Opinion of the International Preliminary Examining Authority," issued in PCT Application No. PCT/US2015/047635, mailed date: Sep. 5, 2016, 10 Pages.

* cited by examiner

600

602
Receive a request at the operating system via one or more application programming interfaces (APIs) from one or more applications to initiate a data sharing session

604
Responsive to the request, initiate creation of the data sharing session via a network connection between the one or more applications with one or more other applications executed by one or more other computing devices associated with guests

606
Broadcasting an invitation by the operating system for receipt by the one or more other computing devices that indicates availability of the data sharing session

608
Discovering the guests by the operating system for participation in the data sharing session

610
Verifying by the operating system that the guests are permitted to participate in the data sharing session

612
Exposing data by the operating system to the one or more applications via the application programming interfaces that is configured to establish a communication channel usable between the one or more applications and the one or more other applications

614
Create a communication channel usable between the one or more applications with one or more other applications

*Fig. 6*

SHARED SESSION TECHNIQUES

BACKGROUND

The types of computing devices that are available to users to interact in a variety of settings is ever increasing, from traditional desktop personal computers to laptops, set-top boxes, game consoles, and mobile computing devices such as mobile phones and tablets. Consequently, the users may have access to a variety of different types of computing devices that may be configured to support interaction in a variety of different settings, such as office, home, mobile use, and so forth.

Conventional techniques that are utilized to support user interaction with these devices, however, are typically single-user centric. For example, a user may login to the computing device to interact with the computing device using a user profile associated with the user. In this way, a user may perform this interaction using custom settings and user preferences. However, these conventional techniques did not provide support for multi-identity interaction and as such these conventional techniques are limited to one-to-one scenarios and thus may be inconvenient in some settings that may involve multiple users, such as parties, meetings, and so forth.

SUMMARY

Data sharing session techniques are described. In one or more implementations, a first user login session is initiated as running in a context of a first user profile of a first user with an operating system of a computing device. A request is received by the operating system to run the first user login session in a context of a second user profile of a second user. The second user profile is associated by the operating system with a shadow login session created within the first user login session of the operating system of the computing device such that interaction of the second user with the operating system is associated with the second user profile and interaction of the first user with the operating system is associated with the first user profile.

In one or more implementations, functionality is exposed by an operating system of a computing device that is accessible by one or more applications executable by the computing device. The functionality is configured to perform operations that include receiving a request at the operating system via one or more application programming interfaces (APIs) from the one or more applications to initiate a data sharing session. Responsive to the request, the data sharing session is initiated via a network connection between the one or more applications with one or more other applications executed by one or more other computing devices associated with guests.

In one or more implementations, a system includes a processing system and memory configured to maintain instructions that are executable by the processing system to implement one or more applications and an operating system. The operating system is executable to expose functionality that is accessible by the one or more applications to cause creation of a communication channel with one or more other applications executed by respective ones of one or more other computing devices. The communication channel created by the operating system is configured to support direct communication between the one or more applications and the one or more other applications without involving the operating system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 6 is a flow diagram depicting a procedure in an example implementation in which a data sharing session is initiated and utilized to share data between applications executed by a host and guests of the host.

DETAILED DESCRIPTION

Overview

Figure 1:
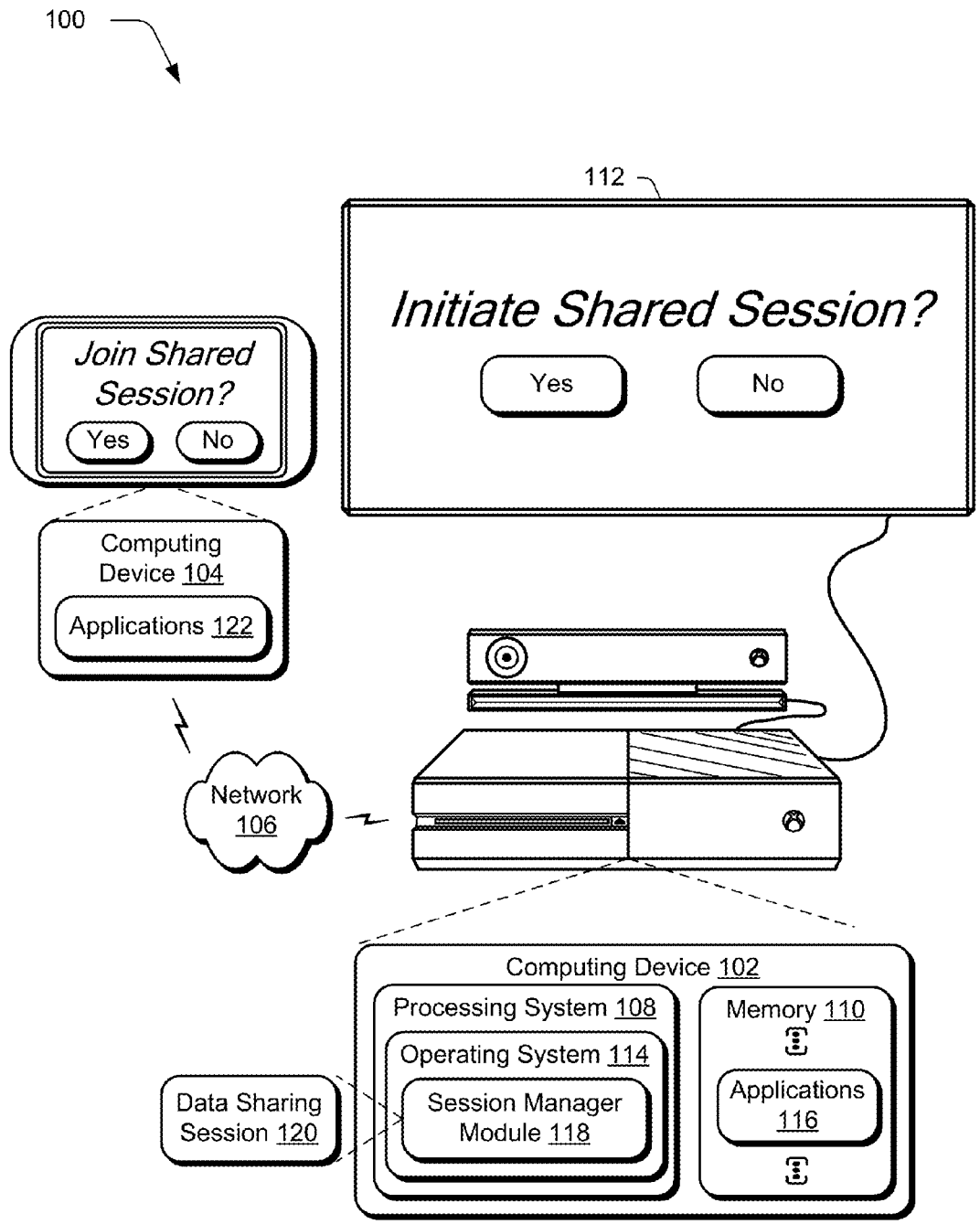
FIG. 1 is an illustration of an environment in an example implementation that is operable to employ data sharing session techniques.

Conventional techniques that support user interaction with computing devices, such as with operating systems and applications of the computing devices, are typically single-user centric and thus limited to one-to-one interaction between a user and a computing device. Consequently, this may limit user interaction with the computing device in multi-user scenarios, e.g., in public settings, meetings in a conference room, users at a party, and so forth.

Data sharing session and collaboration techniques are described. In one or more implementations, an operating system of a computing device is configured to provide an infrastructure that may be leveraged by applications of the computing device with applications of other computing devices to use and share common resources. The operating system, for instance, may be configured to generate communication channels and support mechanisms for broadcast, discovery, authentication of guests for participation in a data sharing session, and creation of communication channels that are configured to support direct communication between the applications.

In this way, the applications may access this functionality through application programming interfaces (APIs) without being aware of how this functionality is implemented, thereby conserving resources of the applications and the computing device itself in implementing this functionality. Further discussion of these and other techniques relating to the operating system infrastructure may be found in relation to FIGS. 2-4 and 6.

Additionally, the data sharing session techniques may be configured to support multi-user interaction with the operating system of the computing device without involving a switch between user logins to identify the users involved in the interaction. The operating system, for instance, may also be configured to generate a shadow login session upon login of a user with an operating system. The user login may cause the operating system to operate in a context of the user's profile, such as to access user settings, customizations, preferences, and so on.

Another user, wishing to interact with the operating system, may select an option (e.g., "run as") to request operation of the operating system using another user profile. In response, credentials of the user may be associated with the shadow login session. In this way, interaction with the individual users with the operating system may be identified by the operating system and associated with the users. The users, for instance, may annotate or edit a document and have those annotations associated with their identities, may access applications and have their user settings and profiles leveraged as part of this interaction (e.g., controller settings, high scores), and so forth. Further discussion of these and other techniques relating to the operating system infrastructure may be found in relation to FIGS. 5 and 7.

Further discussion of these and other data sharing session techniques may be found in relation to the following sections. In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ the data sharing session techniques described herein. The illustrated environment 100 includes a computing device 102 and another computing device 104 that are communicatively coupled, one to another, via a network 106.

The computing devices 102, 104 may be configured in a variety of ways. For example, the computing devices 102, 104 may be configured as a conventional desktop computer, a mobile station, an entertainment appliance, a mobile computing device having a housing configured in accordance with a handheld configuration (e.g., a mobile phone or tablet), a set-top box communicatively coupled to a display device, a wireless phone, a game console as illustrated, and so forth.

Thus, the computing devices 102, 104 may range from full resource devices with substantial memory and processor resources (e.g., personal computers, game consoles) to low-resource devices with limited memory and/or processing resources (e.g., traditional set-top boxes, hand-held game consoles). Additionally, although instances of a single computing devices 102, 104 are shown, the computing devices 102, 104 may be representative of a plurality of different devices, such as multiple servers utilized by a business to perform operations such as by a web service, a remote control and set-top box combination, an image capture device and a game console configured to capture gestures as illustrated, and so on.

The computing device 102 is illustrated as including a processing system 108, an example of a computer-readable storage medium illustrated as memory 110, and a display device 112. The processing system 108 is representative of functionality to perform operations through execution of instructions stored in the memory 110. Although illustrated separately, functionality of these components may be further divided, combined (e.g., on an application specific integrated circuit), and so forth.

The computing device 102 is further illustrated as including an operating system 114. The operating system 114 is configured to abstract underlying functionality of the computing device 102 to applications 116 that are executable on the computing device 102. For example, the operating system 114 may abstract processing system 108, memory 110, network, and/or display 112 functionality of the computing device 102 such that the applications 116 may be written without knowing "how" this underlying functionality is implemented. The application 116, for instance, may provide data to the operating system 114 to be decoded, rendered and displayed by the display device 112 without understanding how this rendering will be performed. The operating system 114 may also represent a variety of other functionality, such as to manage a file system and user interface that is navigable by a user of the computing device 102.

An example of the abstracted functionality of the operating system 114 is represented as a session manager module 118. The session manager module 118 is representative of functionality to expose an infrastructure that is accessible to the applications 116 to create a data sharing session 120 for use between the applications 116 and applications 122 of the other computing device 104 via the network 106. The session manager module 118, for instance, may support an ability to initiate a secure communication channel between the applications 116, 118. This may include an ability to initiate the data sharing session 120 through interaction with a user interface, an example of which is output on the display device 112.

The session manager module 118 may then broadcast invitations and discover potential guests for inclusion in the data sharing session 120. This may include authentication of the users and may leverage strong authentication techniques, such as to output a user interface on the other computing device 104 such that entry of credentials of the user may not be snooped as could be the case using a common display device that is viewable by other users, e.g., in a conference room setting, a television at a party, and so forth.

Once authenticated, the session manager module 118 may then expose data to the application 116 that is usable to create a direct and secure communication channel between the applications 116 and the applications 122 of the other computing device 104 via the network 106 without involving the operating system 114. The data, for instance, may reference identification of the other users and a socket to be used to perform the communication.

Additionally, the session manager module 118 may provide an ability to specify limited access, privileges, and time authorization to such guests, such that the guest may, upon successful authentication, access their own personal resources, e.g., user settings, preferences, and configuration data, subject to these specified constraints as part of creation of the data sharing session 120, e.g., which may be included in characteristics of a list as further described below. For example, authentication may be performed to determine users "are who they say they are" and authorization may be performed to grant access, e.g., for a specified amount of time. This may be configurable and pre-set, or may be displayed in the user experience and thus may mitigate potential concerns some hosts may have in granting access. Further, dynamic authentication techniques may be supported such that the operating system 114 may provide access to guests without prior knowledge, configuration (e.g., on the part of an administrator of the operating system 114), or provision of resources of the operating system 114.

Thus, the operating system 114 may provide a mechanism to use and share common resources on a host machine (e.g., computing device 102) with guests utilizing other devices, e.g., computing device 104. This mechanism may support a way for hosts and guests to discover data sharing sessions 120 and once discovered, establish a communication channel to support this data sharing.

The session manager module 118 may also support use of shadow user profiles to support sharing of resources within the operating system 114 itself. For example, the session manager module 118 may expose functionality that is selectable by a second user to provide a "run as" feature while in a context of a login session of a first user's profile. Selection of this feature may cause credentials of a user to be associated with a shadow login session contained within a first user logon session. This may be utilized, for instance, to leverage features of the operating system 114 to roam user settings and preferences, such as an identity, background, and so on for this additional user. This may be utilized to support a variety of functionality, such as an ability of the operating system 114 to identify individual user's interaction with the operating system 114 itself, use by applications 116 that are executed on the computing device 102, and so forth. Further discussion of these and other features may be found in the following and is shown in corresponding figures.

Figure 2:
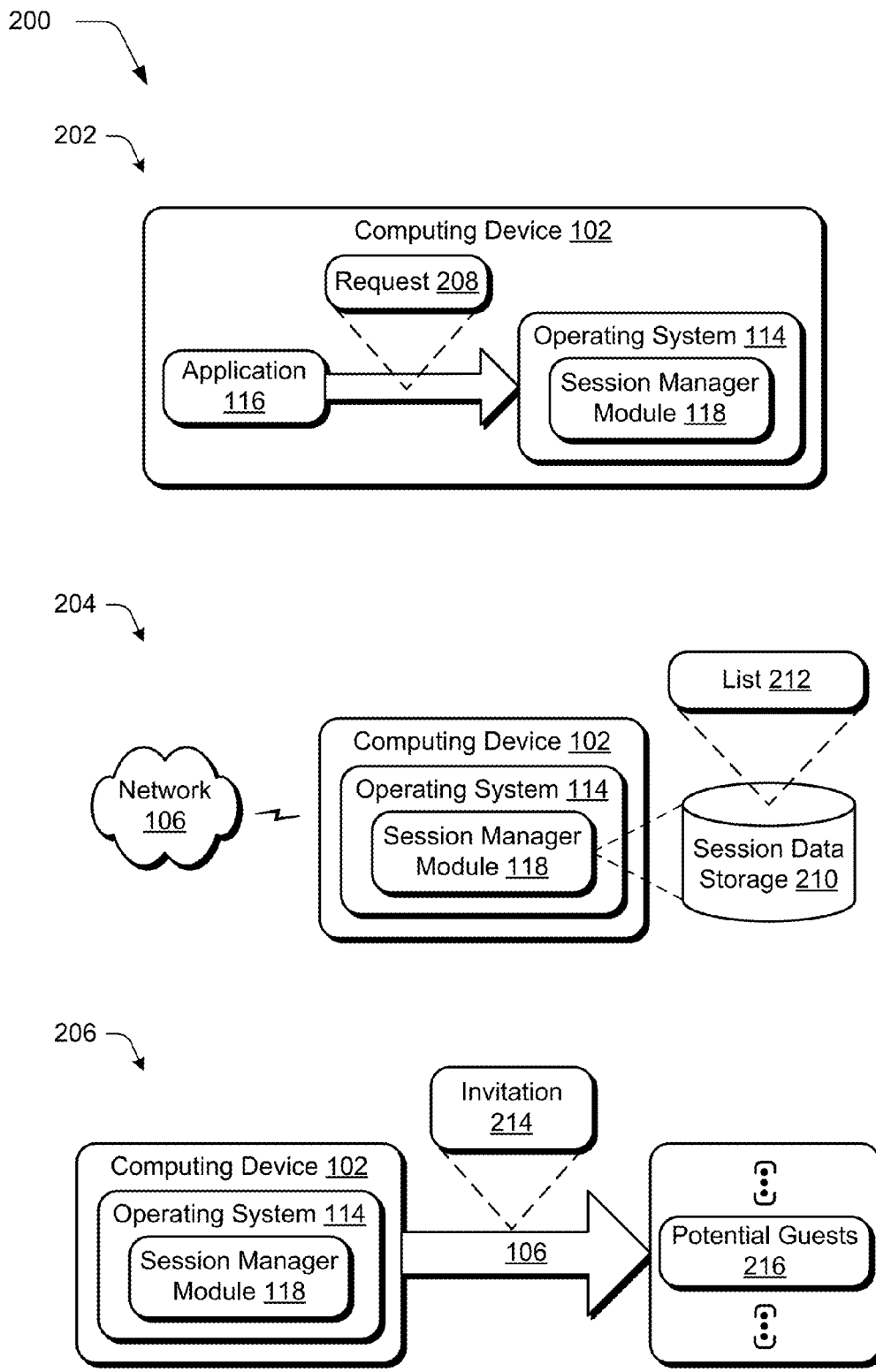
FIG. 2 depicts a system in an example implementation in which a request is received by an operating system of FIG. 1 via application programming interfaces from an application to initiate a data sharing session.

FIG. 2 depicts a system 200 in an example implementation in which a request is received by an operating system via application programming interfaces from an application to initiate a data sharing session. The system 200 is illustrated using first, second, and third stages 202, 204, 206.

At the first stage 202, a session manager module 118 receives a request from an application 116 to initiate a data sharing session 120. The application 116, for instance, may be configured to host a content sharing session to share photos, music preferences, collect feedback regarding content in a meeting (e.g., a slideshow, document, image), and so forth. For example, the application 116 may be initiated at a game console to provide music at a user's location for a party, may be initiated to collect comments regarding marketing materials, share photos associated with a particular event (e.g., concert, sporting event), and so forth.

Accordingly, the application 116 may be executed by the computing device 102 to form the request 208 for communication via the application programming interfaces (APIs). This request 208 may be used to leverage an infrastructure represented by the session manager module 118 of the operating system 114 to initiate creation of the secure data sharing session 120 to share this content.

At the second stage 204, the session manager module 118 creates a session data storage 210 location that may be utilized to store data related to the data sharing session 120. This may include data describing the data sharing session 120, such as an identification and purpose of the data sharing session 120. This may also include characteristics specified by a user that initiated creation of the data sharing session (e.g., included as part of the request 208), such as a list 212 of characteristics of guests that are permitted to participate in the data sharing session 120, constraints on participation as previously described, and so forth.

These characteristics may include identities, which may be specified manually, automatically through friends in a social network service (e.g., friends of a user in a social network service may be given automatic permission to join the data sharing session 120), and so on. The characteristics may also include a location of the guests (e.g., through geo-fencing to specify users located at a particular geographic location), a time of day, how the access is to be permitted (e.g., particular types of network connections used to participate in the data sharing session 120), and so forth. This list 212 may be utilized as part of verification/authorization of the guests by the session manager module 118 of the operating system 114, an example of which is described in greater detail in relation to FIG. 3.

At the third stage 206, the session manager module 118 of the operating system 114 broadcasts invitations 214 over the network 106 for receipt by potential guests 216 of the data sharing session 120. This broadcast may be performed in a variety of ways, such as over a local wireless network (e.g., Bluetooth®, Wi-Fi). In another example, the broadcast of the invitation 214 may leverage a social network service, such as to post automatically to friends in a social network service, and so forth. In this way, the infrastructure provided by the session manager module 118 as part of the operating system 114 may be leveraged by the application 116 to initiate creation of the data sharing session 120, including broadcast of the invitation 214 to potential guests 216 without the application 116 knowing how these operations are performed. The invitations 214 may be used by the session manager module 118 to discover the potential guests 216, further discussion of which may be found in relation to the following description and is shown in a corresponding figure.

Figure 3:
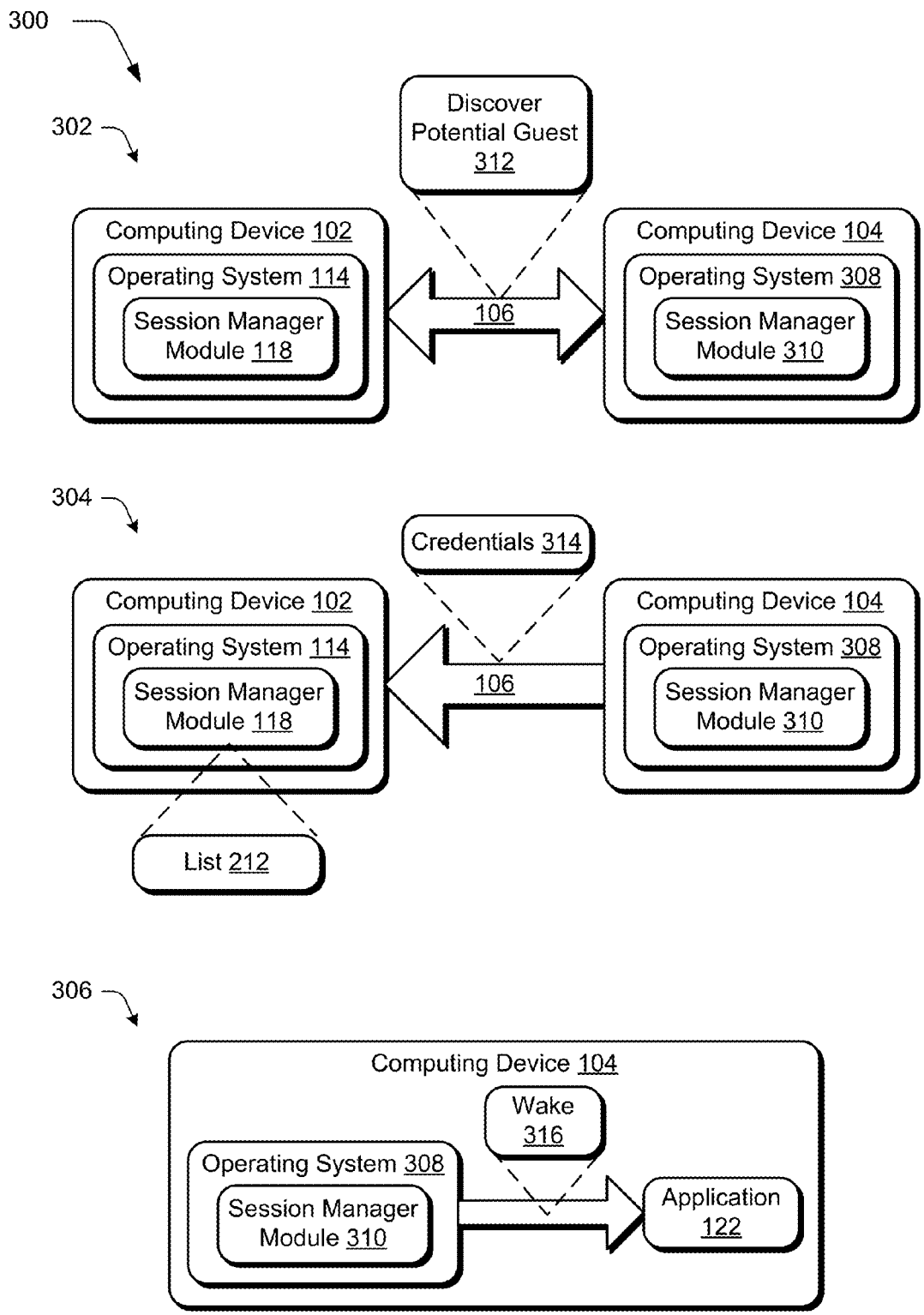
FIG. 3 depicts a system in an example implementation in which discovery of potential guests and authentication of the potential guests for participation in a data sharing session is performed by a session manager module of an operating system of FIG. 2.

FIG. 3 depicts a system 300 in an example implementation in which discovery of potential guests and authentication of the potential guests for participation in a data sharing session is performed by a session manager module 118 of an operating system 114. The system 300 is illustrated using first, second, and third stages 302, 304, 306. At the first stage 302, the session manager module 118 communicates with the other computing device 104 via the network 106. The other computing device 104 also includes an operating system 308 and a session manager module 310. Thus, in this example the session manager modules 118, 310 may support a shared infrastructure to initiate the data sharing session. Other examples are also contemplated, such as to communicate to an application of the other computing device 104 that does not include a session manager module 310 as further described below.

Through communication between the session manager modules 118, 310 with each other in this instance (e.g., over an appropriate channel that has been negotiated for such communication between the modules), the session manager module 118 that is configured to manage initiation of the data sharing session 120 may discover potential guests 312.

Continuing with the previous broadcast example, this discovery may be performed in a variety of ways. For example, active discovery techniques may be employed in which the session manager module 118 broadcasts the invitations 214 and then may receive responses of potential guests 216 that wish to join the data sharing session 120. Passive discovery techniques may also be employed in which the session manager module 118 receives requests to join the data sharing session 120 without receipt of a broadcast invitation 214, e.g., the session manager module 310 may broadcast requests without knowing if a data sharing session 120 of computing device 102 is available.

At the second stage 304, regardless of how the potential guest is discovered as represented by the other computing device 104, the session manager module 118 may receive credentials 314 to verify the computing device 104 for inclusion in the data sharing session 120. The session manager module 212, for instance, may employ the list 212 that describes characteristics of the data sharing session 120 that are to be met to permit participation in the data sharing session 120. These characteristics may include identities, which may be specified manually, automatically through friends in a social network service, and so on. The characteristics may also include a location of the guests (e.g., through geo-fencing to specify users located at a particular geographic location), a time of day, how the access is to be permitted (e.g., particular types of network connections used to participate in the data sharing session 120), and so forth. Although verification is illustrated as being performed at the computing device 102, this verification may also be performed, in whole or in part, at the computing device 104 (e.g., using a third-party authentication service), use of the third-party authentication service itself, and so on. Once verified, the process of initiating creation of the data sharing session 120 may continue.

As shown in the third stage 306, for instance, once authenticated the session manager module 310 of the operating system 308 of the other computing device 104 may wake 316 a corresponding application 122 of the other computing device 104. The data sharing session 120, for instance, may correspond with execution of particular applications 116, 122 of the computing devices 102, 104. Therefore, a user may interact with application 116 to cause session manager module 118 of the operating system 114 of computing device 102 to initiate the data sharing session 120. The session manager module 118 may then communicate with the session manager module 310 of the other computing device 104 to perform discovery and authentication.

Once discovered and/or authenticated, the session manager module 310 may then wake the corresponding application 122 and provide details of a secure communication channel to be used for the data sharing session 120. Other examples are also contemplated, such as to wake the application 122 upon discovery to perform the authentication, e.g., strong authentication in which a user interface is output by the other computing device 104 to receive credentials input by a user such that these credentials are not viewable via a common display device, e.g., the display device 108 configured as a television in FIG. 1. A communication channel may then be formed to support direct communication between the applications 116, 122, further discussion of which may be found in the following description and is shown in a corresponding figure.

Figure 4:
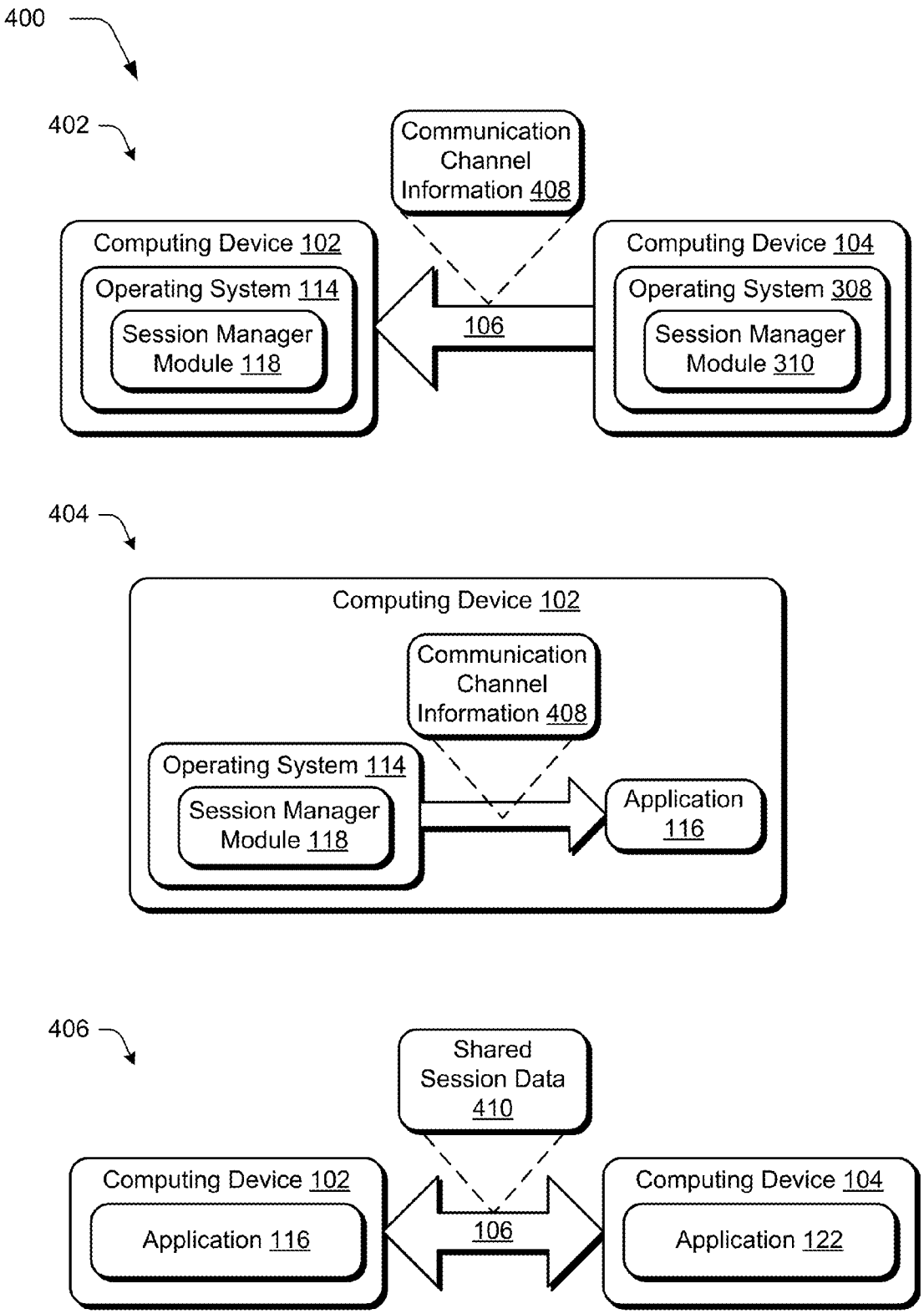
FIG. 4 depicts a system in an example implementation in which a communication channel is created by session manager modules of the operating systems of the computing devices and utilized by applications of FIG. 3 to directly share session data.

FIG. 4 depicts a system 400 in an example implementation in which a communication channel is created by the session manager modules 118, 310 of the operating systems 114, 308 of the computing devices 102, 104 and utilized by the applications 116, 122 to directly share session data. The system 400 is also illustrated using first, second, and third stages 402, 404, 406. At the first stage 402, continuing with the previous example the session manager modules 118, 310 have negotiated authentication of the computing device 104 for participation in the data sharing session 120. The session manager module 310 then communicates communication channel information 408 that is usable by the applications 116, 122 to form a direct communication channel. The communication channel information 408, for instance, may specify a communication socket along with other relevant data such as a user's identity (e.g., a multi-service access "MSA" identifier), credentials, pairing information, and so on.

At the second stage 404, the session manager module 118 of the computing device 102 notifies the application 116 of the arrival of the guest (e.g., computing device 104) and exposes the communication channel information 408 to the application. Thus, in this example this is a first time that the application 116 is made aware of the guest as the operations described earlier are abstracted away and performed by the operating system 114.

At the third stage 406, the application 116 uses the communication channel information 408 to open a communication channel to communicate directly with the application 122 of the computing device to support communication of shared session data 410. The operating system 114, for instance, may open a socket as specified by the communication channel information 408. The socket may then be used such that the applications 116, 122 may communicate directly with each other without involving respective operating systems 114, 308.

The shared session data 410 may take a variety of forms, such as photos, user preferences (e.g., playlists), sharing of content stored locally at the devices and/or accessible remotely by the devices, and so forth. For example, the application 116 may be configured to provide music for a party and therefore the shared session data 410 may describe music preferences of a user of the other computing device 104 and may even include the music itself for streaming and output by the computing device 102. Thus, shared session data 410 may reside locally at the respective computing devices 102, 104 and/or be accessible remotely by respective computing devices 102, 104 "over the cloud."

In this example, the session manager module 118 of an operating system 114 communicated with a session manager module 310 of another operating system 308. Other implementations are also contemplated. For example, the computing devices 102, 104 may execute operating systems designed by different incompatible entities, e.g., different manufacturers. Therefore, in such an implementation the session manager module 118 may interact directly with an application 122 to perform the discovery, authentication, and communication channel techniques described above without negotiation with a potentially incompatible operating system of the other computing device 104. Further, it should be readily apparent that along a single guest was described that these techniques may be utilized to broadcast, discover, authenticate, and form communication channels with a plurality of computing devices associated with other users without departing from the spirit and scope thereof.

Figure 5:
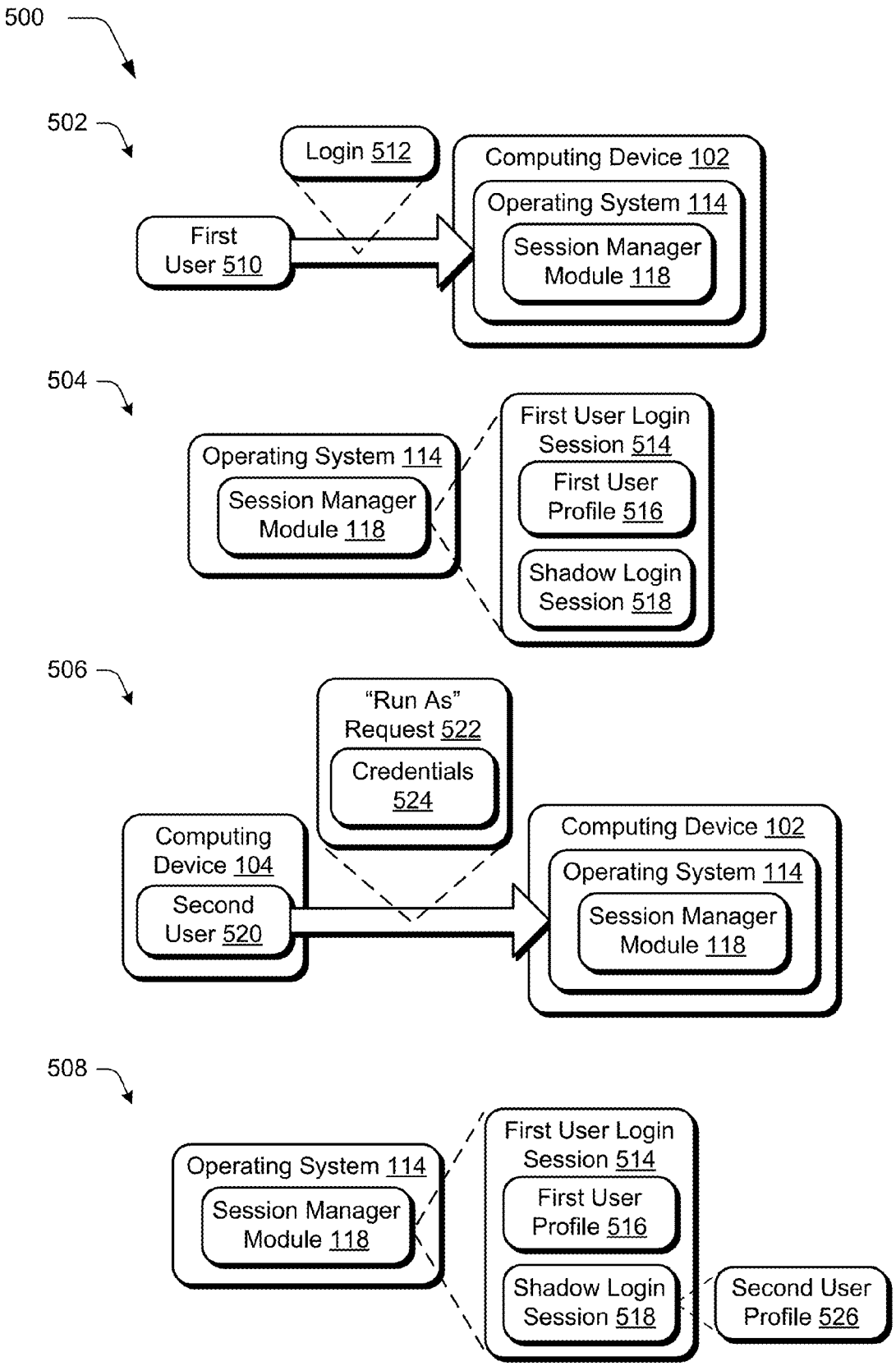
FIG. 5 depicts a system in an example implementation in which a shadow login session is utilized to support multi-user interaction with an operating system.

FIG. 5 depicts a system 500 in an example implementation in which a shadow login session is utilized to support multi-user interaction with an operating system. The system 500 is also illustrated using first, second, third, and fourth stages 502, 504, 506, 508. Data sharing sessions may take a variety of different forms. In the previous example, the data sharing session is configured to leverage an infrastructure of an operating system to initiate a data sharing session between applications of different computing devices. In this example, the data sharing session is configured to support simultaneous multi-user access to a single operating system of a computing device without involving login/log out of users to switch between user login sessions that run in the context of different user profiles of different users.

At the first stage 502, for instance, a first user 510 logs in 512 to an operating system 114 of a computing device 102. This may include providing login credentials such as a user name and password. For example, the first user 510 may login to the computing device 102 in a conference room to display a spreadsheet during a meeting with a plurality of other users.

At the second stage 504, the session manager module 118 of the operating system 514, in response to the login 512, creates a first user login session 514 that is configured to run in a context of a first user profile 516. The session manager module 118, for instance, may utilize the credentials described above to locate user settings and preferences to configure a user experience of the operating system 114 for interaction with the first user 510. This may include specification of a background image of a start screen/desktop, arrangement of icons, settings to be used with applications, and so on. Further, this may also include recognition of interaction with content as occurring by the first user 510. Continuing with the previous example, for instance, the first user 510 may make changes to the spreadsheet during a meeting and have those changes attributed to the first user 510. In another example, limited availability (via an authorization) may be granted, e.g., to the spreadsheet specifically in this example, that expires after a set amount of time defined by the user, e.g., at the end of the meeting.

The session manager module 118 may also create a shadow login session 518, e.g., upon creation of the first user login session 514 or later in response to a "run as" request as shown in the third stage 506. The shadow login session 518, for instance, may be configured as a "blank" login session that is not associated with a particular user and as such does not include user preferences and settings for that user. The shadow login session 518 may be implemented on a thread that is separate (e.g., "sandboxed") from one or more threads used to implement the first user profile context of the first user login session 514.

Additionally, the shadow login session 518 may be given a reduced set of permissions such that functionality of the shadow login session 518 is restricted in comparison with the context of the first user profile 516 of the first user login session 514, such as to limit network access, an ability to make changes to operation of the operating system 114 or applications 118, and so forth. Further, the shadow login session 518 may be configured to run within the first user login session 514, e.g., such that permissions and functionality of the shadow login session 518 inherits from the first user login session 514 thereby limiting which functionality of the operating system 114 is made available to the shadow login session.

At the third stage 506, a second user 520 associated with another computing device 104 makes a "run as" request 522 to the computing device 102. Other examples are also contemplated in which the second user 520 directly interacts with the computing device 102, e.g., does not use another computing device 104 as an intermediary such as by typing on a keyboard of the computing device 102, to make the "run as" request 522. The "run as" request 522 may be initiated in a variety of ways, such as through direct interaction with the operating system 114 (e.g., interaction with a menu output by the operating system 114) and/or indirect interaction through an application 116 that then communicates with the operating system 114.

Continuing with the previous example, the second user 520 may select an option in the spreadsheet application to run in a context of a second user profile associated with the second user. The operating system 114 may then utilize credentials 524 received from the second user 516 to login the second user 516 in a manner similar to that descried in relation to the first stage 502 for the first user 510.

At the fourth stage 508, the session manager module 118 associates a second user profile 526 with the shadow login session 518 such that the second user 516 may interact with the computing device 102 in a context of the second user profile 526 via the shadow login session 518. Continuing with the previous example, the session manger module 119 may utilize the credentials 524 to locate data of the second user profile 526, such as user preferences, settings, an identify of the second user 520, and so on.

In this way, the session manager module 118 may identify interaction performed by the first and second users 510, 520 with their corresponding first and second user profiles 516, 526. For example, the first and second users 510, 520 may make changes to the spreadsheet and have those changes associated with the users through their profiles.

In another example, applications 116 may be configured to run in the context of the second user profile 526 in the shadow login session 518, such as to get a high score, controller preferences, and so on that may be fetched "from the cloud." In this way, the shadow login session 518 may be configured to support simultaneous use by a plurality of users yet still leverage preferences, customization, and other roaming functionality that is included as part of the operating system 114 without switching between logins. Further discussion of these and other techniques may be found in relation to the following procedures.

Example Procedures

The following discussion describes data sharing session techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Functionality, features, and concepts described in relation to the examples of FIGS. 1-5 may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

FIG. 6 depicts a procedure 600 in an example implementation in which a data sharing session is initiated and utilized to share data between applications executed by a host and guests of the host. A request is received at the operating system via one or more application programming interfaces (APIs) from one or more applications to initiate a data sharing session (block 602). Application 116, for instance, may form a request 208 for receipt by the session manager module 118 of the operating system 114 via one or more APIs.

Responsive to the request, creation of the data sharing session is initiated via a network connection between the one or more applications with one or more other applications executed by one or more other computing devices associated with guests (block 604). The session manager module 118, for instance, may provide an infrastructure that supports broadcast, discovery, authentication, and negotiation of a secure communication channel automatically and without input from the application 116. An invitation, for instance, may be broadcast by the operating system for receipt by the one or more other computing devices that indicates availability of the data sharing session (block 606). This invitation 214 may be broadcast in a variety of ways to potential guests 216, such as via a posting to a social network service, via a wireless connection, and so forth.

The guests are discovered by the operating system for participation in the data sharing session (block 608). This discovery may include passive discovery (e.g., potential guests 216 ask to join without receipt of an invitation) or active discovery that does involve use of an invitation.

The operating system verifies that the guests are permitted to participate in the data sharing session (block 610). This may include verification of credentials of the user as well as checking a list 212 to verify that the potential guests 216 comply with specified criteria for the data sharing session 120.

Data is exposed by the operating system to the one or more applications via the application programming interfaces that is configured to establish a communication channel usable between the one or more applications and the one or more other applications (block 612). This data, for instance, may include data describing a socket to be used to communicate as well as identify the potential guests 216. A secure communication channel may then be created that is usable between the one or more applications with the one or more other applications (block 614), such as to support direct communication between the applications via the socket that does not involve active participation by the operating system 114.

Figure 7:
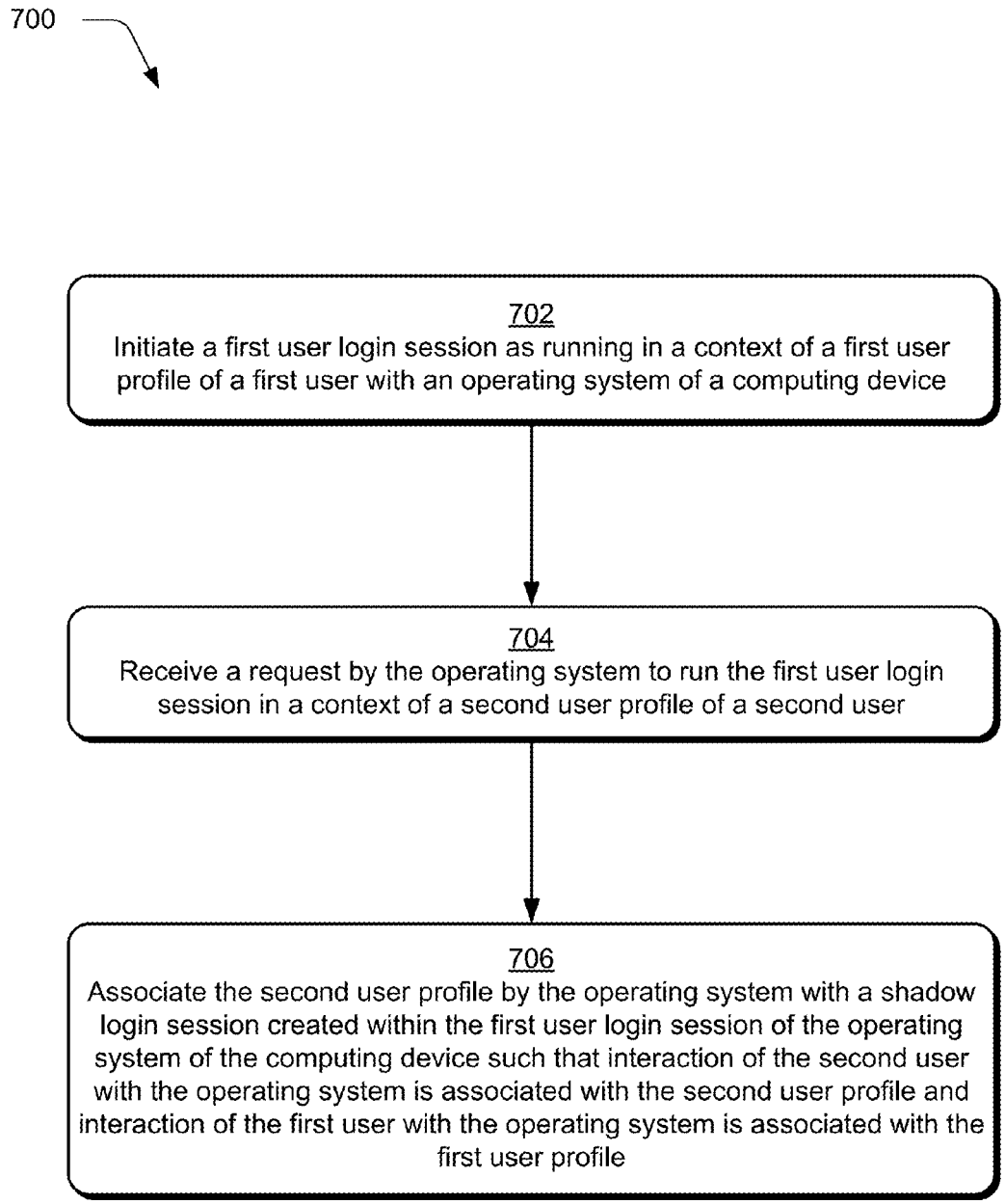
FIG. 7 is a flow diagram depicting a procedure in an example implementation in which a user profile is associated with a shadow login session.

FIG. 7 depicts a procedure 700 in an example implementation in which a shadow login session is utilized to support multi-user interaction with an operating system. A first user login session is initiated as running in a context of a first user profile of a first user with an operating system of a computing device (block 702). A first user 510, for instance, may initiate a login 512 with an operating system 114 of a computing device 102.

A request is received by the operating system to run the first user login session in a context of a second user profile of a second user (block 704). Continuing with the previous example, a second user 520 may initiate a "run as" request 522 to the operating system 114 of the computing device 102, which may be performed through direct interaction with the computing device 102 or indirect interaction using another computing device 104.

The second user profile is associated by the operating system with a shadow login session created within the first user login session of the operating system of the computing device such that interaction of the second user with the operating system is associated with the second user profile and interaction of the first user with the operating system is associated with the first user profile (block 706). The shadow login session 518, for instance, may be created responsive to the login 512 of the first user 510, responsive to the "run as" request 522 from the second user 520, and so on. Data associated with a second user profile 526 may then be populated to the shadow login session 518 such that the shadow login session 518 runs in the context of the second user profile 526. This may be utilized to support a variety of functionality, such as to identify particular users, run applications with a particular user's settings, and so forth as previously described.

Example System and Device

Figure 8:
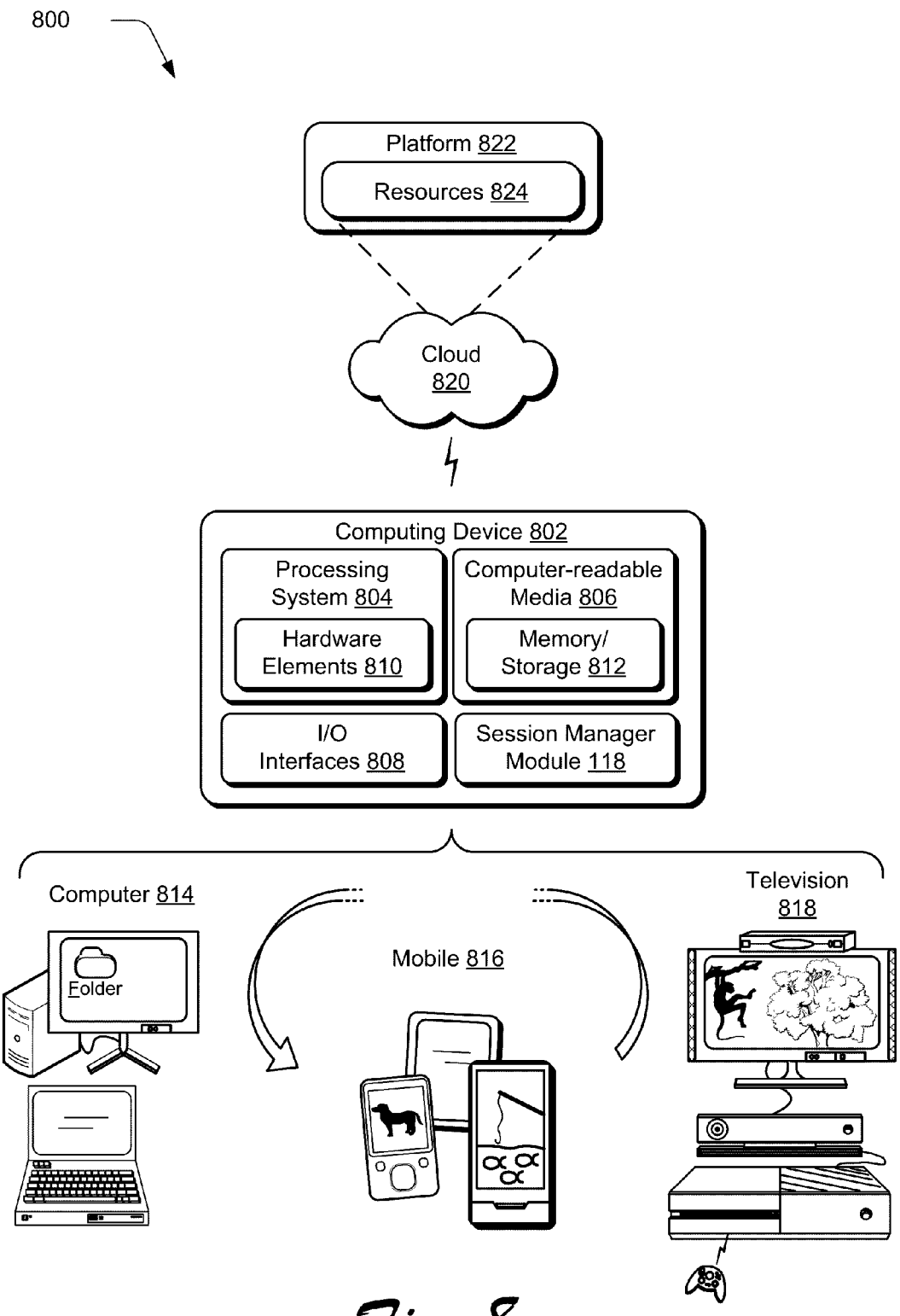
FIG. 8 illustrates an example system including various components of an example device that can be implemented as any type of computing device as described with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. An example of this is illustrated through inclusion of the session manager module 118. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. This functionality may also be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method comprising:
   initiating a first user login session as running in a context of a first user profile of a first user with an operating system of a computing device;
   creating, by the operating system, a shadow login session upon initiation of the first user login session and in the absence of a request to run the first user login session in a context of a second user profile of a second user;
   after creating the shadow login session, receiving, by the operating system, a request to run the first user login session in the context of the second user profile of the second user;
   securely verifying credentials associated with the second user profile received as part of the request and, responsive to the verifying, receiving user settings for the second user to associate the second user profile with the shadow login session; and
   associating the second user profile, by the operating system, with the shadow login session without switching between logins, such that interaction of the second user with the operating system is associated with the second user profile and interaction of the first user with the operating system is associated with the first user profile.

2. A method as described in claim 1, wherein the shadow login session is executed on a thread separate from one or more threads used to execute the first user profile of the first user login session.

3. A method as described in claim 1, wherein the request is received through interaction with an application that is executed by the computing device and the associating causes the application to be executed such that interaction of the second user with the application is associated with the second user profile and interaction of the first user with the application is associated with the first user.

4. A method as described in claim 3, wherein the interaction of the first user and the second user with the application is performable without switching a login.

5. A memory device having program instructions stored thereon that, upon execution by a processor of a computer system, cause the computer system to:
   create a shadow login session upon initiation of a first user login session in a context of a first user profile of a first user with an operating system of the computing device;
   receive a request to run the first user login session in the context of a second user profile of a second user;
   securely verify credentials associated with the second user profile received as part of the request and, responsive to the verifying, receive user settings for the second user to associate the second user profile with the shadow login session; and
   associate the second user profile with the shadow login session without switching between logins, wherein interaction of the second user with the operating system is associated with the second user profile and interaction of the first user with the operating system is associated with the first user profile.

6. The memory device of claim 5, wherein the shadow login session is executed on a thread separate from one or more threads used to execute the first user profile of the first user login session.

7. The memory device of claim 5, wherein the request is received through interaction with an application that is executed by the computing device and the associating causes the application to be executed, and wherein interaction of the second user with the application is associated with the second user profile and interaction of the first user with the application is associated with the first user.

8. The memory device of claim 7, wherein the interaction of the first user and the second user with the application is performable without switching a login.

9. A computer system, comprising:
   a processor; and
   a memory coupled to the processor, the memory having program instructions stored thereon that, upon execution by the, cause the computer system to:
   create a shadow login session upon initiation of a first user login session in a context of a first user profile in the absence of a request to run the first user login session in a context of a second user profile of a second user;

receive a request to run the first user login session in the context of a second user profile of a second user;

securely verify credentials associated with the second user profile received as part of the request and, responsive to the verifying, receive user settings for the second user to associate the second user profile with the shadow login session; and associate the second user profile with the shadow login session without switching between logins, wherein interaction of the second user with the operating system is associated with the second user profile and interaction of the first user with the operating system is associated with the first user profile.

10. The computer system of claim 9, wherein the shadow login session is executed on a thread separate from one or more threads used to execute the first user profile of the first user login session.

11. The computer system of claim 9, wherein the request is received through interaction with an application that is executed by the computing device and the associating causes the application to be executed, wherein interaction of the second user with the application is associated with the second user profile and interaction of the first user with the application is associated with the first user, and wherein the interaction of the first user and the second user with the application is performable without switching a login.

* * * * *